United States Patent
Kuhn et al.

[15] 3,687,297
[45] Aug. 29, 1972

[54] SHAPED BODY FOR FILTERING AND DRYING OF LIQUIDS AND GASES AND PROCESS OF MAKING THE SAME

[72] Inventors: Konrad Kuhn; Manfred Boedecker, both of Hannover, Germany

[73] Assignee: Kali-Chemie Aktiengesellschaft, Hannover, Germany

[22] Filed: July 2, 1970

[21] Appl. No.: 52,122

[30] Foreign Application Priority Data

July 4, 1969 Germany..........P 19 34 030.8
May 22, 1970 Germany..........P 20 24 910.9

[52] U.S. Cl.....................................210/502, 55/387
[51] Int. Cl. ...............................................B01d 39/00
[58] Field of Search.......................210/500–510, 492, 210/496; 264/122; 55/387, 389, 524

[56] References Cited

UNITED STATES PATENTS

| | | |
|---|---|---|
| 3,538,020 | 11/1970 | Heskett et al...........210/502 X |
| 3,235,089 | 2/1966 | Burroughs..............210/502 X |
| 3,347,391 | 10/1967 | Steensen.................210/492 X |
| 3,025,233 | 3/1962 | Figert........................210/502 |
| 3,531,558 | 9/1970 | Ganz..........................264/122 |
| 3,545,622 | 12/1970 | Sakhnovsky et al. ...210/502 X |

*Primary Examiner*—Reuben Friedman
*Assistant Examiner*—R. W. Burks
*Attorney*—Michael S. Striker

[57] ABSTRACT

A shaped porous body for filtering and drying gases and liquids is formed of a solid adsorptive drying agent or adsorbent and about between 10 and 0.3 percent of a binding agent relative to the weight of said drying agent or adsorbent, the said binding agent consisting essentially of the reaction product between a di- or polyisocyanate and a polyester or polyetherpolyol which reaction product is hardened to a polyurethane.

16 Claims, No Drawings

SHAPED BODY FOR FILTERING AND DRYING OF LIQUIDS AND GASES AND PROCESS OF MAKING THE SAME

BACKGROUND OF THE INVENTION

The present invention relates to shaped porous bodies for filtering and drying liquids and gases and a process of making the same.

The problem of drying and maintaining dry liquids is important, for instance, in connection with refrigerants, particularly the fluorochlorohydrocarbons which are used as refrigerating agent in cooling apparatus. Humidity in the pathway of the refrigerant can cause serious difficulties because of ice formation in the expansion valve or by hydrolysis of the refrigerant leading to the formation of corrosive acids.

The drying agent used principally in connection with circulating refrigerants can be, apart from calcium sulfate, activated aluminum oxide, silicic acid gels and molecular sieves. The drying agents are used, if possible, in solid or granulated form. Some abrasion and dust cannot be entirely avoided where the drying agent in the cooling apparatus is exposed to the flow of the cooling liquid and to mechanical vibrations. Even with silicic acid gel and silicic acid particles of pearl shape which are presently principally used, dust and abrasion cannot be eliminated entirely, in spite of the high hardness of these materials. This abrasion and/or dust finds its way partly into the refrigerant and interferes with the action thereof. Besides, clogging of the valves and other narrow places of the apparatus occurs. It is therefore indispensable to provide for corresponding filters in the circulation flow together with the use of these drying agents in order to prevent the clogging up of the valves, etc.

It has also been proposed to employ the drying agents together with binding agents so as to form shaped bodies which can be incorporated as such in a suitable vessel through which the refrigerant circulates. It has been possible in this manner to use small silicic acid gel bodies of about 1 mm diameter and thus to form rather compact drying cartridges which can be incorporated comparatively easily in the circulation path. The advantage of these shaped bodies is that fine dust and abrasion no longer occur. In addition these shaped bodies have the advantage that they can be used not only for drying but also perform a mechanical dust filter with a comparatively larger filter surface if the shape is adjusted for this purpose.

However, these drying cartridges present the difficulty that suitable binding agents are not readily available. It is not sufficient in this connection that the binding agent has a good binding action for the drying medium but, in addition, it must meet a number of other requirements:

1. the water-absorption capacity of the drying agent must not be reduced by the binding agent in order to assure a high degree of efficiency for the apparatus.
2. The binding agent must resist swelling or solution in the refrigerant.
3. The binding agent must be sufficiently permeable for the liquid refrigerant, in other words, its flow resistance must be as low as possible.

Various binding agents have been proposed in this connection to make drying cartridges, for instance polyvinyl chloride, polyethylene, polyvinyl acetate, polyvinyl ether and phenol and urea condensation products. However, the results with these binding agents were not satisfactory. Only polyvinylbutyral was acceptable in respect of strength and permeability of the material. However, in the presence of fluorochlorohydocarbons, polyvinylbutyral cannot be used since it swells in these materials. Besides, all binding agents just mentioned reduce the capacity of the drying agent.

The proposal has also been made to use cellulose acetate or other cellulose derivatives in order to make a liquid-permeable but nevertheless dustproof coating for the drying agent. However, the stability against breakage and crumbling of these bodies is small. Illustrative for this shortcoming is the fact that the proposal has been made to use this type of drying agent in a porous housing, for instance in wire screen tubings and then to apply the coating to the exterior of the tubing. This is obviously a cumbersome and costly process and the materials are subject to various objections.

It is therefore an object of the present invention to provide for a shaped drying agent which avoids the drawbacks and difficulties just described.

SUMMARY OF THE INVENTION

This object is met by forming a shaped porous body which comprises a solid adsorptive drying agent or adsorbent and about between 10 and 0.3 percent of a binding agent relative to the weight of the drying agent or adsorbent, the said binding agent consisting essentially of the reaction product between a di- or polyisocyanate and a polyester or polyetherpolyol which reaction product is in the form of a hardened polyurethane.

The invention also embraces a process of making this product. For this purpose a solid adsorptive drying agent or adsorbent is mixed with (a) a di- or polyisocyanate and (b) a polyester or polyetherpolyol or mixtures of the latter two compounds, the amount of said components at (a) and (b) being 0.3 to 10 grams for each 100 grams of drying agent or adsorbent, whereupon this mixture is poured in a mold and subjected to curing to a hard polyurethane at a temperature between 20° and 120° C.

DESCRIPTION OF THE PREFERRED EMBODIMENTS

As can be seen, the amount of the reaction mixture which is necessary to form the polyurethane is comparatively small relative to the amount of drying or filtering agent. The preferred amount in the hardened shaped body is only about 0.3 to 5 g and, still more specifically, 0.5 to 3 g of polyurethane for each 100 g of drying agent. Thus, it is possible to form a form-stable porous body which has a high capacity for water adsorption and high permeability for liquids and gases. In particular it has been found that bodies of increased porosity can be formed if the amount of binding agent is properly adjusted and is in particular not too high. When using quartz sand to produce a filtering agent the amount of the binding agent required depends on the fineness of the quartz sand; the finer grains require a greater amount of binding agent than the coarser ones. By using a polyetherpolyol as the polyol component, it is possible to obtain formed bodies having particularly good mechanical strength.

The process of the invention permits to produce shaped bodies of high stability in which there may be incorporated any conventional solid adsorptive drying agent or a filtering agent, particularly those consisting of activated aluminum oxide, silicic acid gel and molecular sieves in pearl form and/or granulated form.

The bodies are normally made by adding the mixture to the drying agent and adjusting the curing temperature depending on the employed starting components. The reaction between the polyisocyanate and the polyol takes place according to the activity of the components and the chosen temperature and leads to the polyurethane, thus causing the solidification of the entire product. The speed of reaction can also be controlled by applying heat, as well as by adding suitable activators.

The shaped bodies of the present invention are accordingly basically different from the materials disclosed in German published application 1,203,458 which consist of a polyurethane foam containing a sorbent which materials have been proposed for use as packing materials which at the same time provide for a control of the humidity content of the container. In the present invention a shaped drying and filtering body is formed which, as distinguishing feature, has a drying capacity as little as possible different from that of the loose drying agent. It was entirely unexpected that the reaction product which has been cured to a hardened polyurethane would form a binding agent for the drying agent which furnished bodies of high strength without, however, closing up the pores of the drying agent and therefore interfering with the drying action thereof. The following tests have shown that the water absorption capacity of silica gel which is incorporated in granulated form in soft or hard foam materials is substantially reduced, as distinguished from the materials of the present invention.

COMPARATIVE TESTS OF PRIOR-ART MATERIALS

1. A polyurethane hard foam was made as follows:

a. A mixture was formed of 100 wt.-parts of polyester having a hydroxyl number of about 213 (polyester formed by adipic acid, phthalic acid, butylene glycol and a triol), 15 wt.-parts trichlorofluoromethane, 0.7 wt.-parts water, 0.33 wt.-parts triethylenediamine and 0.5 wt.-parts of a copolymer of dimethylpolysiloxane and polyalkyleneether. This mixture was then added to 40 wt.-parts of 2,4-toluylene-diisocyanate. There was thus formed a foam having a uniform fine cell structure.

b. A foam was formed as described in (a) but, prior to the foaming, silica gel was added to the polyester in an amount to provide for 15.5 wt.-% of silica gel in the final product. There was thus obtained a coarse cell structure hard foam in which the silica was unevenly distributed in the bottom area of the foam body.

2. A polyurethane soft foam was made as follows:

c. 100 wt.-parts of a polyester mixture was formed of the following components: 70 wt.-parts having an OH number of 40 and 30 wt.-parts having an OH number of 60 (polyester consisting predominantly of adipic acid and diethylene glycol), 1.5 wt.-parts of N-ethylmorpholine, 0.5 wt.-parts of a non-ionic activator, 0.8 wt.-parts of a mixture of 50% dispersing agent and 50% sulfurized castor oil, 0.4 wt.-parts of N-cocomorpholine, 0.1 wt.-parts of a silicone copolymer and 3.0 wt.-parts of water. This mixture was added to 40 parts 2,4-toluylene-diisocyanate. There was obtained a soft foam of a fine pore formation.

d. A foam was formed as in (c) but, prior to the foaming, silica gel was added to the polyester in an amount to provide for 15.5 wt.-% of silica gel in the final product. There was thus obtained a soft foam of a large cell structure in which the silica gel was distributed in the bottom area.

Specimens were then subjected to tests of the products of the process at (b) and (d) which contained 20.0 g of silica gel. The water adsorption capacity of the specimens was determined by storing the same for 4 hours at a relative air humdity between 95 and 98%. As comparison, 20.0 g of loose silica gel, not containing a binding agent, and identified as (e) below, was subjected to the same conditions. The water capacity of the test specimens (b) and (d) and the comparison specimen (e) was as follows, in weight-percent relative to the employed amount of silica gel:

| (b) | (d) | (e) |
|---|---|---|
| 16.1% | 13.05% | 23.6% |

The water adsorption capacity of the specimens (a) and (c), which did not include silica gel but were also tested, was found to be so low that their practical use was out of the question.

The thus-obtained figures should be compared with the figures obtained with the products of the invention which will be found particularly in Examples 2 and 3 below. It appears that the reduction of the water adsorption capacity of the silica gel which is incorporated in a foam is due to the fact that the gel is largely covered and enveloped during the foaming process. On the other hand, the formed body containing the drying agent of the present invention apparently was characterized by a point-shaped connection of the individual particles between drying agent and binding agent provided the amounts were adjusted properly.

For the formation of the polyurethane, most of the conventional polyisocyanates and polyols can be used. Examples of polyisocyanates are for instance toluylene-2,4--diisocyanate, toluylene-2,6-diisocyanate and customary mixtures thereof, diphenylmethane-4,4'-diisocyanate, methylenetriisocyanate and polymethylenepolyphenylisocyanate.

Examples of suitable polyols are for instance the following:

Polyethers formed by reacting olefin oxides with polybasic alcohols, amino-basic polyols (aminoalcohols), e.g. N,N,N', N'-tetrakis(2-hydroxypropyl)ethylene.

Polyesters, that is, reaction products of polycarboxylic acids with poly-basic alcohols, for instance reaction products of adipic acid and glycol, glycerine, etc. Also castor oil or talloil can be used in this connection.

By adding suitable accelerators the reaction can be controlled to be complete within a few minutes. Preferred accelerators are amines such as triethylamine, N-methylmorpholine, N-ethylmorpholine, triethylenediamine or piperazine. As activators there can also be used compounds such as tin-(II)-octoate, dibutyltindilaurate, tinoleate or tinhexoate, which may be combined with amines. By proper selection of the starting products formed bodies can be made already at room temperature in a comparatively short time. The reaction can however also be carried out at temperatures up to about 120° C. The curing time may be between 2 and 30 minutes depending on the curing temperature and the amount of catalyst used.

The solid adsorptive drying agent is dried prior to the incorporation into the reaction product of the polyisocyanate and polyhydroxy compound and is activated in this manner. Small amounts of humidity which may still be present in the drying agent or enter the same during the making of the shaped body do not interfere, since they are immediately removed by a reaction occurring between the isocyanate and the water. If this is contemplated, a small excess over the stoichiometric amount of polyisocyanate should be added, since otherwise not enough polyisocyanate is present for the reaction with the polyol.

The process of the invention has the advantage that no contraction of the volume occurs during hardening. The shaped bodies are therefore hardened without tension occurring, and therefore are not subject to cracking apart. The formed bodies completely occupy the mold after the hardening operation. They are form-stable and have a high degree of strength. Since the making of the bodies is effected without the addition of solvents, the initial reaction and the hardening, if desired, can be carried out in one single operation.

The bodies have a high degree of strength already upon addition of only small amounts of binding agent. A support for the body by an exterior or intermediate envelope is not necessary. The high binding strength of the polyurethane permits to vary the size of the drying agent particles in a wide range. It is easily possible to use pearl shaped drying agents with a particle size of more than 1.5 mm.

The shaped bodies of the invention have a water adsorption capacity which is hardly different form that of the loose drying agent. They also have a high permeability for liquids and gases. Small amounts of dust and other contaminants are retained without causing any noticeable reduction of the permeability.

The formed bodies are resistant and stable in respect of refrigerants, particularly fluorinated chlorohydrocarbons. They also are inert against all kinds of organic liquids and can therefore be used also for other drying purposes.

The process of the invention permits to make formed bodies of still further improved filtering properties by incorporating, in addition to the sorbent material which has the principal property of the drying action, other materials which are predominantly distinguished by their adsorptive or mechanical filtering action. Examples of such other materials are activated coal, bentonite and quartz sand. The amount of the individual components depends on the desired use of the formed bodies. Since the composition of the mixtures can be varied over a broad range, the formed bodies can be adjusted to any type of desired use. The bodies of the invention are therefore suited for multiple use.

One use for the combined bodies just described is likewise in the refrigeration industry. Refrigerants in cooling apparatus may contain, in addition to humidity, small amounts of acids, dissolved waxes, oil coal, oil sludge and similar. To remove these contaminants activated carbon is usually incorporated in the circuit of the refrigerant in loose form enclosed in a drying vessel.

It has already been proposed in U.S. Pat. No. 3,407,617 to employ shaped bodies which contain activated coal in addition to the drying agent proper. However, the drying capacity and permeability of these shaped bodies was small because of the comparatively high amounts of binding agent. 25% by weight of phosphate binding agent or synthetic organic resin binders were necessary for a mixture of 55% by weight of drying agent and 20% by weight of activated coal. These formed bodies have therefore not found industrial acceptance. Formed bodies which only consist of activated coal could not be made at all with these binding agents since they required at least twice the amount of binding agent as just stated.

As distinguished, the mixtures of the present invention and the formed bodies formed thereby may contain, for instance, bentonite, activated coal and/or quartz sand in addition to the drying agent. These mixtures of different adsorbent materials can be used as such or the different materials can be incorporated in separate layers. In the first case the mixtures of all the materials and, in the latter case, the individual components of each layer are mixed with the mixture which is then hardened to a polyurethane. For the total amount of solid adsorbents not more than 10 g binding agent for each 100 g of solid material is necessary and, preferably, the amount is not higher than 5 g binding agent. If the individual components are arranged in layers the amount of binding agent must be adjusted to the material present in the layer. If a layer consists only of activated coal, the amount of binding agent must be increased in excess of 10%. Depending on the granulation of the activated coal, between 10 and 20 wt.-% of binding agent should be used. However, the amount of binding agent can be reduced if sand is added to the activated coal.

It will be understood that by the process of the invention formed bodies can also be made which contain only materials distinguished by their mechanical and adsorptive filter effect as the solid ingredients.

It is customary to use drying agents and filtering materials also for drying and purifying gases, for instance air, combustion gases or for adsorption of solvent vapors. This use of the bodies of the invention is therefore also of importance and no limitation to a particular of the products is intended.

The following examples will further illustrate the invention.

EXAMPLE 1

100 wt.-parts of dried commercially available pearl-shaped silicic acid gel with a diameter between 2 and 6 mm were mixed with 2 wt.-parts of a mixture of stoichiometric amounts of a polyether on trimethylolpropane basis having a hydroxyl number of about 520 and diphenylmethane-4,4'-diisocyanate. The mixture was effected above the solidification point of the isocyanate. The mixture after pouring into a mold was then hardened at 45° C. The hardening was complete after 30 minutes. The obtained formed body had a high stability.

EXAMPLE 2

A drying agent-containing formed body was made as described in Example 1, except that the mixture of polyether and diphenylmethane-4,4'-diisocyanate was employed in an amount of 3 wt.-parts instead of 2 wt.-parts. A formed body having a high form stability was obtained.

The drying agent bodies of Examples 1 and 2 possessed a high permeability for liquids. They were resistant to fluorinated hydrocarbons. In tests of their stability by placing them in monofluorotrichloromethane at 20° C for 5 weeks no swelling occurred.

The water adsorption capacity of the bodies of Examples 1 and 2 was tested by passing air of varying relative humidity at 25° C through the body and comparing the capacity with that of the loose drying agent.

The water vapor adsorption at equilibrium at 25° C was as follows:

| % rel. humidity | Ex. 1 wt.−% | Ex. 2 wt.−% | loose drying agent |
| --- | --- | --- | --- |
| 10 | 6.4 | 6.3 | 6.6 |
| 20 | 9.7 | 9.7 | 10.6 |
| 40 | 21.1 | 21.0 | 21.9 |
| 60 | 32.1 | 32.2 | 33.6 |
| 80 | 35.5 | 35.3 | 37.1 |

EXAMPLE 3

100 wt.-parts of a dry commercially available pearl-shaped silicic acid gel were mixed with 2 and 3 wt.-parts, respectively, of a mixture of stoichiometric amounts of a trimethylpropane based polyether with a hydroxyl number of about 520 and an isomer mixture at a ratio of 80:20 of 2,4- and 2,6-toluylenediisocyanate and were hardened at 45° C after pouring into a mold. In both cases stable bodies with high permeability for liquids and gases were obtained.

The water adsorption capacity of the formed bodies was only little different from that of the loose drying agent as shown by the following table.

This table shows the water vapor adsorption at 25° C at equilibrium:

| % rel. humidity | binding agent (2%) wt.−% | (3%) wt.−% |
| --- | --- | --- |
| 10 | 5.9 | 6.5 |
| 20 | 9.4 | 9.9 |
| 40 | 20.8 | 21.2 |
| 60 | 29.8 | 31.0 |
| 80 | 32.7 | 33.8 |

EXAMPLE 4

A commercially available dried pearl-shaped silicic acid gel in an amount of 100 wt.-parts was mixed with 2.7 wt.-parts of a mixture of stoichiometric amounts of an adipic acid-based polyester (hydroxyl number 570) and polymethylenepolyphenylisocyanate and was then filled into a mold. The curing was effected at 70° C in 10 minutes. The permeability, water adsorption capacity and form stability of the bodies were very good.

EXAMPLE 5

100 wt.-parts of an activated drying agent consisting 70 wt.-parts of a pearl-shaped silicic acid gel, 20 wt.-parts of a microfilter material (molecular sieve) and 10 wt.-parts of aluminum oxide were mixed with 2.2 wt.-parts of the mixture of a pentaerythrite polyether and an isomer mixture at the ratio of 65 : 35 of 2,4- and 2,6-toluylenediisocyanate. The mixture was hardened in a mold at 80° C. The obtained shaped body had an excellent form stability and water adsorption capacity.

EXAMPLE 6

100 wt.-parts of a fine grain activated aluminum oxide were mixed with 3 wt.-parts of the mixture of a glycerin base polyether (hydroxyl number 450) and diphenylmethane-4,4'-diisocyanate in the presence of N-ethylmorpholine as activator. The mass was filled into a mold and hardened at room temperature. The obtained body had a high form stability.

EXAMPLE 7

100 wt.-parts of a mixture consisting of 40 wt.-parts of a pearl-shaped silicic acid gel, 30 wt.-parts of a microfilter (molecular sieve), 10 wt.-parts quartz sand and 20 wt.-parts of activated carbon were mixed with 2.5 wt.-parts of a trimethylolpropane-based polyether (hydroxyl number about 520) and diphenylmethane-4,4'-diisocyanate. The mixture was effected above the solidification point of the isocyanate. Hardening was effected at 45° C for 30 minutes. A form-stable body was obtained which had an excellent permeability for liquids and gases and a high water adsorption capacity.

EXAMPLE 8

A layered body was formed by mixing 125 g of pearl-shaped silicic acid gel, 125 g of a microfilter material, 125 g of quartz sand with 2 g each of the polyether-diisocyanate mixture described in Example 7. In addition 50 g of activated carbon were mixed with 10 g of the same mixture of Example 7. The individual mixtures were filled in the sequence just given into a mold and hardened for 30 minutes at 45° C. Relative to the total amount of material in the formed body the binding agent amounted to about 3.8 wt.-%. The formed body had an excellent form stability. The permeability and water adsorption capacity of the body was not substantially reduced by the layer formation.

EXAMPLE 9

Example 6 was repeated with the difference that instead of activated AL$_2$O$_3$ 100 wt.-parts of fine grain quartz sand was used and 6 parts by weight of the binding agent of the same composition. The obtained body had a very good form stability and an excellent permeability for liquid and gases. It may be used as filtering agent.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A form-stable shaped porous body for use in filtering and drying gases and liquids comprising a solid agglomerate selected from the group consisting of adsorptive drying agents, principally adsorbent agents and filtering agents and between about 10 and 0.3% of a binding agent relative to the weight of said drying agent, the said binding agent being essentially a member selected from the group consisting of the reaction product of substantially stoichiometric amounts of a di- or polyisocyanate with a polyester and the reaction product of substantially stoichiometric amounts of a di- or poly-isocyanate with a polyether-polyol which reaction product is in the form of a hardened polyurethane, the individual particles of said agglomerate thus being held together by a point-shaped connection.

2. The shaped body of claim 1, wherein the binding agent is present in an amount between about 5 and 0.3% by weight.

3. The shaped body of claim 1, wherein the binding agent is present in an amount between about 3 and 0.5% by weight.

4. The shaped body of claim 1, wherein the solid adsorptive drying agent is a silicic acid gel, activated aluminum oxide or a molecular sieve or a mixture of these materials.

5. The shaped body of claim 1, which includes a principally adsorbent and filtering agent in addition to said solid adsorptive drying agent.

6. The shaped body of claim 5, wherein the said adsorbent and filtering agent is activated coal, bentonite or quartz sand.

7. The shaped body of claim 5, wherein the adsorptive drying agent and the principally adsorbent and filtering agent are arranged in layers.

8. The porous body of claim 7, wherein the principally adsorbent and filtering agent is activated coal and wherein the binding agent in the layer or layers wherein the activated coal is present is present at between about 10 and 20% by weight.

9. The process of making the form-stable shaped porous body of claim 1, comprising mixing a solid dried activated agglomerate selected from the group consisting of adsorptive drying agents, principally adsorbents and filtering agents with a stoichiometric mixture of a di- or polyisocyanate with at least one member selected from the group consisting of a polyester and a polyetherpolyol, 0.3 to 10 g of said mixture being employed for each 100 g of drying agent or adsorbent, whereupon the mixture is poured into a mold and subjected to curing to a hard polyurethane at a temperature between 20° and 120° C.

10. The process of claim 9, wherein an amount of said mixture is used of 0.3 to 5 g for each 100 g of said drying agent or adsorbent and filtering agent.

11. The process of claim 9 wherein an amount of said mixture is used of between about 0.5 and 3 g for each 100 g of said drying agent or adsorbent and filtering agent.

12. The process of claim 9, wherein an activator is added to said mixture to accelerate the curing.

13. The process of claim 1, wherein the drying agent and a principally adsorbent and filtering agent are poured into the said mold successively to form a layered body.

14. The process of claim 13, wherein an amount of between about 10 and 20% by weight of binding agent is added together with activated coal employed as the principally adsorbent and filtering agent in at least one of said layers.

15. The process of claim 9, wherein the drying agent is a member selected from the group consisting of silicic acid gel, activated aluminum oxide, a molecular sieve and a mixture of these materials.

16. The form-stable shaped porous body of claim 1, wherein the principally adsorbent and filtering agent is quartz sand.

* * * * *